(No Model.)
M. H. RISON.
RAKE OR FORK.
No. 495,836. Patented Apr. 18, 1893.
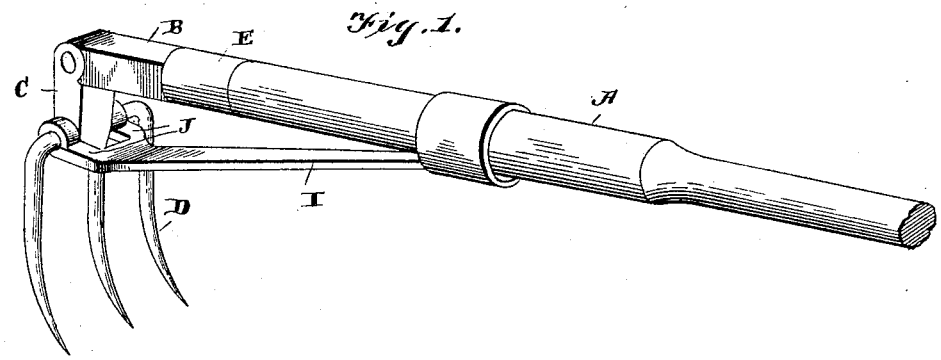
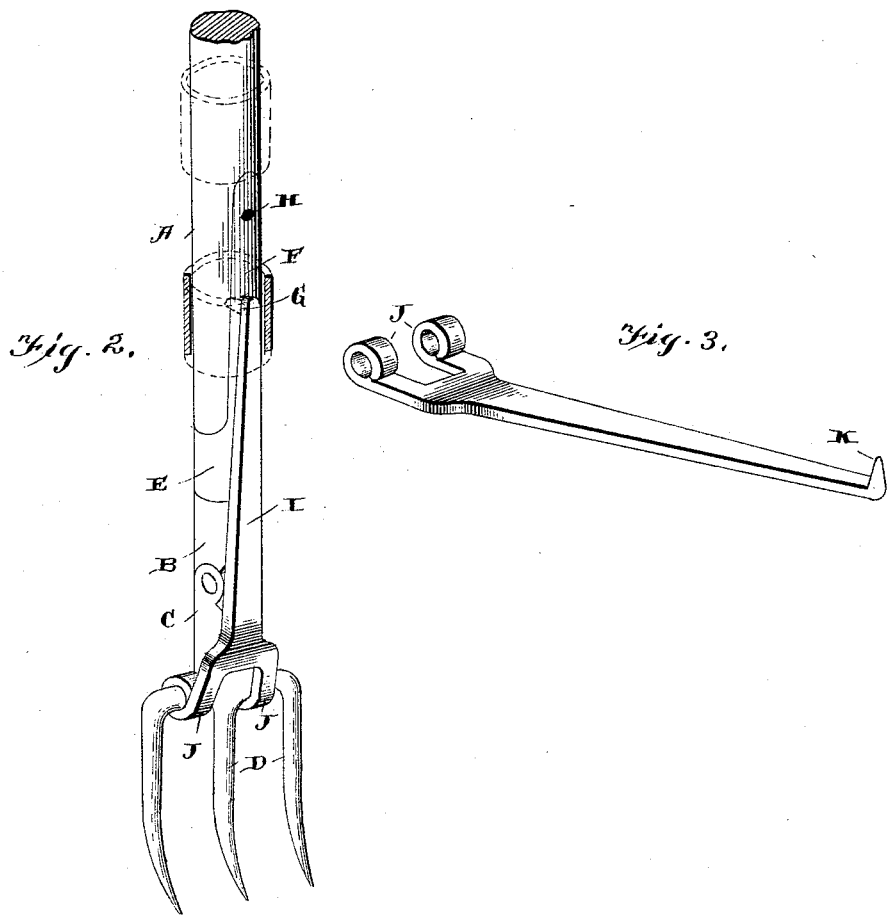
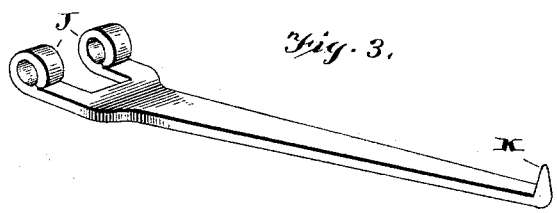
Witnesses
Geo. E. Fuch
Rol A Fitzgerald
Inventor
M. H. Rison
By Lehmann Patterson Nesbit
Attys.

UNITED STATES PATENT OFFICE.

MARCELLUS H. RISON, OF PARIS, TENNESSEE.

RAKE OR FORK.

SPECIFICATION forming part of Letters Patent No. 495,836, dated April 18, 1893.

Application filed October 17, 1892. Serial No. 449,190. (No model.)

*To all whom it may concern:*

Be it known that I, MARCELLUS H. RISON, of Paris, in the county of Henry and State of Tennessee, have invented certain new and useful Improvements in a Combined Rake and Fork; and I do hereby declare the following to be a full, clear, and exact description of the invention, such as will enable others skilled in the art to which it pertains to make and use it, reference being had to the accompanying drawings, which form a part of this specification.

My invention relates to an improvement in combined rakes and forks; and it consists in the novel manner in which the prongs are held in position for either a fork or rake as the case may require, which will be more fully described hereinafter, and especially referred to in the claims.

The object of my invention is to construct an improved tool which may be used either as a fork or a rake thus combining in one instrument practically two tools.

Referring to the accompanying drawings,— Figure 1 is a perspective view of my tool when used as a rake. Fig. 2, is a similar view showing the same as a fork. Fig. 3, is a detached view of the brace.

A, designates the handle of the tool; B, a shank projecting therefrom and C, a shank which projects rearward from the prongs D, and which is pivotally connected to the end of the shank B, as shown. A ferrule E, encircles the end of the handle A, and projecting rearward therefrom is the plate F, which rests on the handle A, to which it is secured. Formed in this plate are the two, openings G, and H.

I, represents a brace having forks J, at its outer end which are coiled around the bases of the prongs D, thus obtaining a secure hold thereon. On the rear end of this brace is formed a lateral spur or projection K, which when the tool is to be used as a fork is confined in the opening G, thus holding the prongs D, outstretched in line with the handle A. When a rake or hook is to be formed of the tool the pronged portion is swung down at right angles to the handle, thus forcing the rear end of the brace I, back to the opening H, into which the spur K, enters. When in either position the brace is confined in place with its spur K, in engagement with either one or the other of the openings G, and H, by means of the sliding sleeve on the handle A, which when moved over the brace holds it securely to the handle. A very strong tool is thus formed which is very simple and cheap of construction and which is very strong in either form in which it is used.

Having thus fully described my invention, what I claim as new, and desire to secure by Letters Patent, is—

1. The combination of a handle, a forked implement pivotally secured thereto, a brace connected at one end to the implement, a lateral spur at the opposite end of the arm adapted to engage spur sockets formed in the handle, and a sleeve movable on the handle and over the spur end of the arm for holding the same in engagement with the handle, substantially as shown and described.

2. The combination of a handle, a prong portion pivotally connected thereto, a brace having a forked end, the forks of the said end being wrapped around the base of the prong portion, a spur projecting from the opposite end of the brace and which engages the handle, and a sleeve adapted to move on the handle over the said brace, substantially as shown and described.

In testimony whereof I affix my signature in presence of two witnesses.

MARCELLUS H. RISON.

Witnesses:
   W. W. FARABAUGH,
   J. F. ADEN.